(12) United States Patent
Matsumura

(10) Patent No.: US 7,034,686 B2
(45) Date of Patent: Apr. 25, 2006

(54) ABNORMALITY SUPERVISING APPARATUS, ABNORMALITY SEARCH SUPPORT METHOD, AND ABNORMALITY SEARCH SUPPORT PROGRAM

(75) Inventor: Yasuhiro Matsumura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 155 days.

(21) Appl. No.: 10/848,128

(22) Filed: May 19, 2004

(65) Prior Publication Data
US 2005/0156732 A1  Jul. 21, 2005

(30) Foreign Application Priority Data
Jan. 20, 2004  (JP)  ............................ 2004-011440

(51) Int. Cl.
*G08B 13/14*  (2006.01)

(52) U.S. Cl. ............................... 340/572.1; 340/825.49

(58) Field of Classification Search ............ 340/572.1, 340/568.1, 572.4, 825.36, 825.49
See application file for complete search history.

(56) References Cited

U.S. PATENT DOCUMENTS

| 6,000,049 A | 12/1999 | Karino et al. | |
| 6,127,928 A * | 10/2000 | Issacman et al. | 340/572.1 |
| 6,499,117 B1 | 12/2002 | Tanaka | |
| 6,822,568 B1 * | 11/2004 | Gehlot et al. | 340/572.1 |

FOREIGN PATENT DOCUMENTS

| JP | 10-23146 | 1/1998 |
| JP | 2000-209203 | 7/2000 |
| JP | 2001-312342 | 11/2001 |
| JP | 2001-215223 | 7/2002 |

* cited by examiner

*Primary Examiner*—John Tweel, Jr.
(74) *Attorney, Agent, or Firm*—Staas & Halsey LLP

(57) ABSTRACT

An abnormality supervising apparatus, an abnormality search support method and an abnormality search support program allow a rapid search for an abnormality spot when supervising a plurality of supervisory objects to check for an abnormality. A belonging data setting section sets hierarchically a plurality of belonging data to which a plurality of supervisory objects belong, respectively. An abnormal condition detection section detects an abnormal condition in each of the supervisory objects. When an abnormal condition is detected in a supervisory object by the abnormal condition detection section, a belonging data display section displays belonging data to which the supervisory object detected having an abnormal condition belongs, hierarchically and linkably.

9 Claims, 6 Drawing Sheets

ABNORMALITY SUPERVISING APPARATUS, ABNORMALITY SEARCH SUPPORT METHOD, AND ABNORMALITY SEARCH SUPPORT PROGRAM

BACKGROUND OF THE INVENTION

1. Field of the Invention

The present invention relates to an abnormality supervising apparatus, an abnormality search support method, and an abnormality search support program.

2. Description of the Related Art

In a conventional abnormality supervising apparatus for supervising a plurality of supervisory objects to check for an abnormality in the operating condition thereof, display screens for monitoring the respective operating conditions of the supervisory objects are arranged independently of each other. For example, separate display screens are prepared, respectively, for the layouts of floors of a building and a plurality of racks, and a spot in question in each particular display screen is identifiably displayed, for example, by coloring, thereby allowing the spot in question to be identified [for example, see Japanese Patent Application Unexamined Publication (KOKAI) Nos. Hei 10-23146 (page 3–4, FIG. 1), 2000-209203 (page 4–9, FIG. 1), 2001-312342 (page 4–17, FIG. 1), and 2002-215223 (page 4–8, FIG. 1)].

Conventionally, the above-described display for identifying a spot in question is merely performed on each individual display screen (e.g. a layout screen corresponding to a certain floor, a configuration screen corresponding to a certain rack, or a screen corresponding to a logical information processing device group present on a network).

With the conventional arrangement, in the event that an abnormality has occurred in the operating condition of one of the supervisory objects, the serviceperson has to search for an abnormality spot by checking a plurality of display screens individually. This is not efficient in making a rapid search for an abnormality spot.

SUMMARY OF THE INVENTION

The present invention was made to solve the above-described problems with the prior art.

Accordingly, an object of the present invention is to provide an abnormality supervising apparatus, an abnormality search support method and an abnormality search support program that allow a rapid search for an abnormality spot when supervising a plurality of supervisory objects to check for an abnormality.

The present invention provides an abnormality supervising apparatus including a belonging data setting section that sets hierarchically a plurality of belonging data to which a plurality of supervisory objects belong, respectively, and an abnormal condition detection section that detects an abnormal condition in each of the supervisory objects. When an abnormal condition is detected in a supervisory object by the abnormal condition detection section, a belonging data display section displays belonging data to which the supervisory object detected having an abnormal condition belongs, hierarchically and linkably.

Thus, belonging data to which a supervisory object detected having an abnormal condition belongs is displayed hierarchically and linkably. Therefore, it is possible to trace links between belonging data to which a supervisory object having an abnormal condition belongs from a higher hierarchical level to a lower one. Accordingly, it is possible to unifiedly manage the belonging data (display screens), which has heretofore been necessary to refer to individually.

Thus, it is possible to make a rapid search for an abnormality spot when supervising a plurality of supervisory objects to check for an abnormality.

Preferably, in the above-described abnormality supervising apparatus, belonging data at an arbitrary hierarchical level comprises image data for displaying a plurality of belonging data at a hierarchical level that is one level lower than the arbitrary hierarchical level, and among the plurality of belonging data at the next lower hierarchical level that are displayed with respect to the belonging data at the arbitrary hierarchical level, belonging data to which the supervisory object detected having an abnormal condition belongs is displayed identifiably.

With the above-described arrangement, when tracing links between belonging data to which a supervisory object having an abnormal condition belongs from a higher hierarchical level to a lower one, it is possible to easily identify the belonging data to which the supervisory object detected having an abnormal condition belongs. Accordingly, it is possible to make a rapid search for a spot where an abnormality has occurred.

Preferably, in the above-described abnormality supervising apparatus, the plurality of belonging data represent spatial positions where the supervisory objects are present, or articles including the supervisory objects, or articles having the supervisory objects as constituent elements.

In addition, the present invention provides an abnormality search support method for use in an abnormality supervising apparatus wherein belonging data to which a particular supervisory object belongs is displayed hierarchically and linkably on the basis of hierarchical data comprising a plurality of hierarchically set belonging data to which a plurality of supervisory objects belong, respectively. The method includes an abnormal condition detecting step of detecting an abnormal condition in each of the supervisory objects, and an identifiably displaying step of displaying, with respect to belonging data at a designated hierarchical level, a plurality of belonging data at a hierarchical level that is one level lower than the designated hierarchical level, wherein belonging data to which a supervisory object detected having an abnormal condition belongs is displayed identifiably.

Preferably, in the above-described abnormality search support method, when the belonging data identifiably displayed at the identifiably displaying step is selected, a plurality of belonging data at a hierarchical level that is one level lower than the selected belonging data are displayed, and at this time, belonging data to which the supervisory object detected having an abnormal condition belongs is displayed identifiably.

In addition, the present invention provides an abnormality search support program for instructing a computer to execute an abnormality search support method in an abnormality supervising apparatus wherein belonging data to which a particular supervisory object belongs is displayed hierarchically and linkably on the basis of a hierarchical data comprising a plurality of hierarchically set belonging data to which a plurality of supervisory objects belong, respectively. The program instructs the computer to execute processing including an abnormal condition detecting step of detecting an abnormal condition in each of the supervisory objects, and an identifiably displaying step of displaying, with respect to belonging data at a designated hierarchical level, a plurality of belonging data at a hierarchical level that is one level lower than the designated hierarchical level, wherein belonging data to which a supervisory object detected having an abnormal condition belongs is displayed identifiably.

The above-described abnormality search support program may be arranged as follows. When the belonging data identifiably displayed at the identifiably displaying step is selected, a plurality of belonging data at a hierarchical level that is one level lower than the selected belonging data are displayed, and at this time, belonging data to which the supervisory object detected having an abnormal condition belongs is displayed identifiably.

As has been detailed above, it is possible according to the present invention to provide an abnormality supervising apparatus, an abnormality search support method and an abnormality search support program that allow a rapid search for an abnormality spot when supervising a plurality of supervisory objects to check for an abnormality.

The above and other objects, features and advantages of the present invention will become more apparent from the following description of the preferred embodiments thereof, taken in conjunction with the accompanying drawings.

DETAILED DESCRIPTION OF THE PREFERRED EMBODIMENTS

An embodiment of the present invention will be described below with reference to the accompanying drawings.

Figure 1:
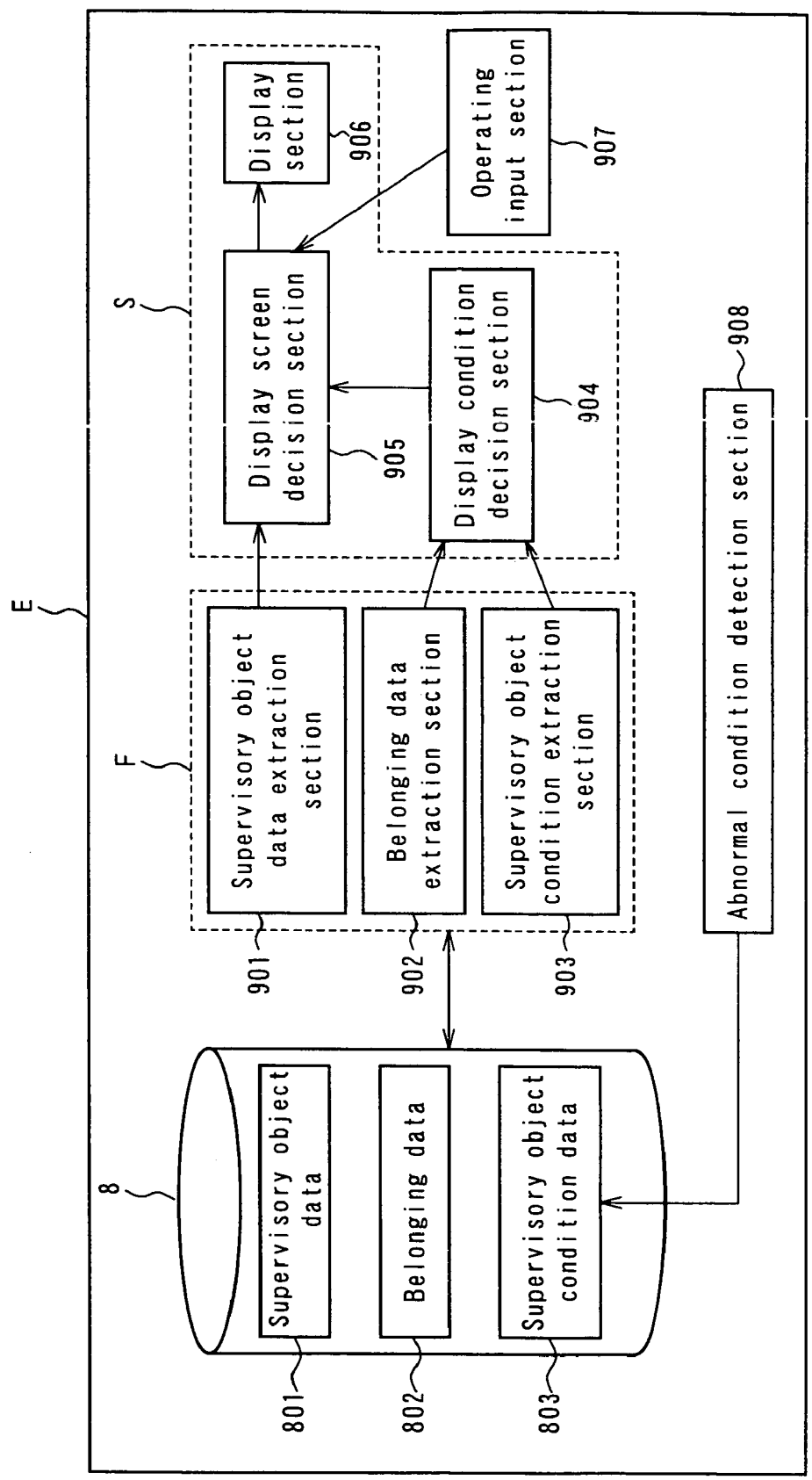
FIG. 1 is a functional block diagram of an abnormality supervising apparatus according to an embodiment of the present invention.

FIG. 1 is a diagram showing the general arrangement of an abnormality supervising apparatus according to an embodiment of the present invention.

The abnormality supervising apparatus E according to this embodiment has a data extraction interface F, a belonging data display section S, an abnormal condition detection section 908, an operating input section 907, and a setting section (database 8) as a belonging data setting section that registers and sets belonging data. It should be noted that these sections are constructed in cooperation with a CPU (not shown) and a storage area (not shown), together with a program stored in the storage area and executed by the CPU.

The data extraction interface F includes a supervisory object data extraction section 901, a belonging data extraction section 902, and a supervisory object condition extraction section 903. The belonging data display section S includes a display condition decision section 904, a display screen decision section 905, and a display section 906.

The data extraction interface F functions as an interface that extracts desired data from supervisory object data 801, belonging data 802 and supervisory object condition data 803 that are stored in the database 8.

Although in this embodiment the database 8 is disposed in the abnormality supervising apparatus E, it should be noted that the present invention is not necessarily limited thereto, and the database 8 may be disposed outside the abnormality supervising apparatus E.

The belonging data 802 stored (set) in the database 8 is data to which a plurality of supervisory objects belong, respectively. A plurality of belonging data are set hierarchically. It should be noted that an operating device for setting data in the database 8 may be included in the setting section in the present invention. For example, the operating input section 907 may be arranged to serve as the operating device for setting data in the database 8.

Next, the operation of the abnormality supervising apparatus according to this embodiment will be described.

Figure 2:
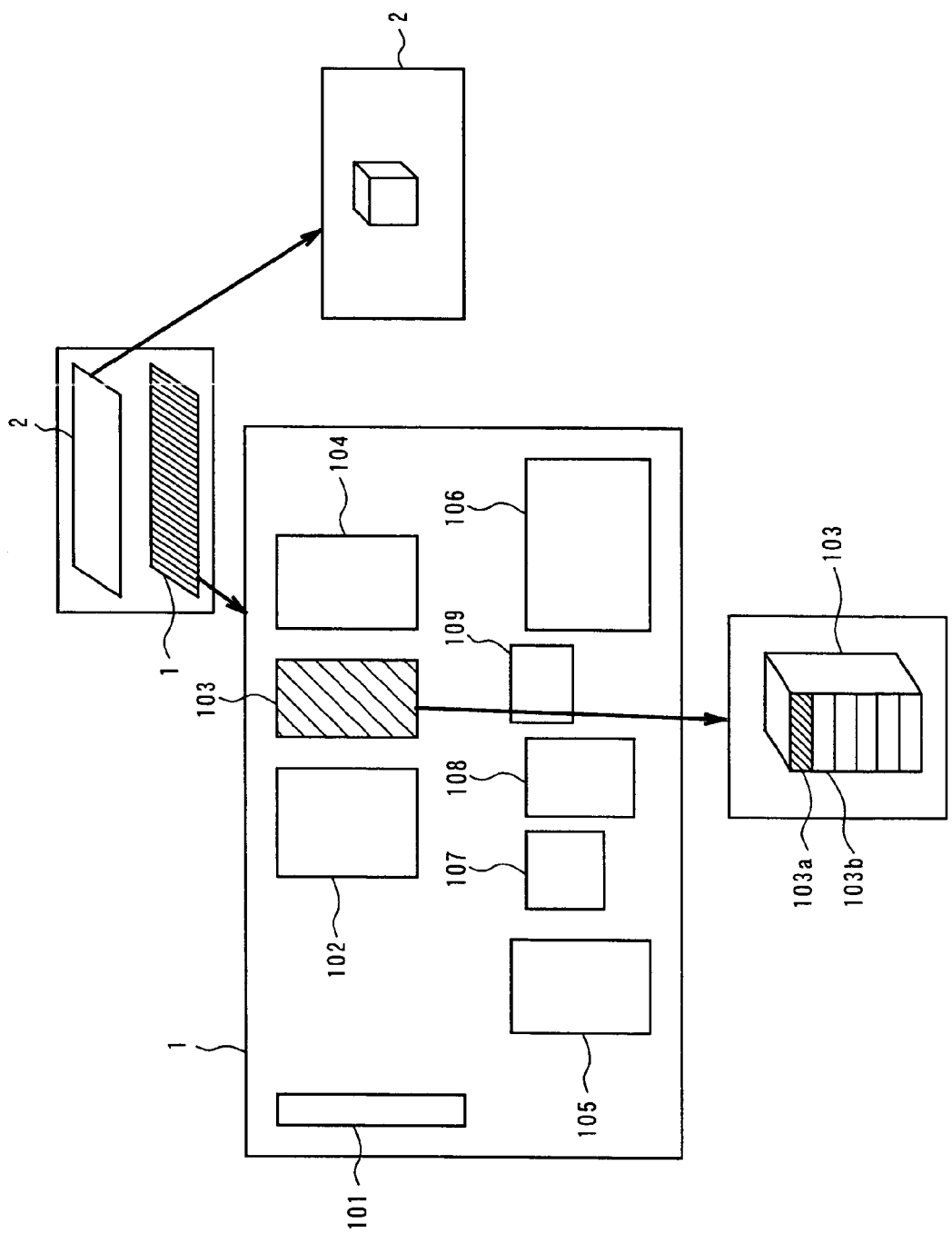
FIG. 2 is a conceptual view for explaining the embodiment of the present invention.
Figure 3:
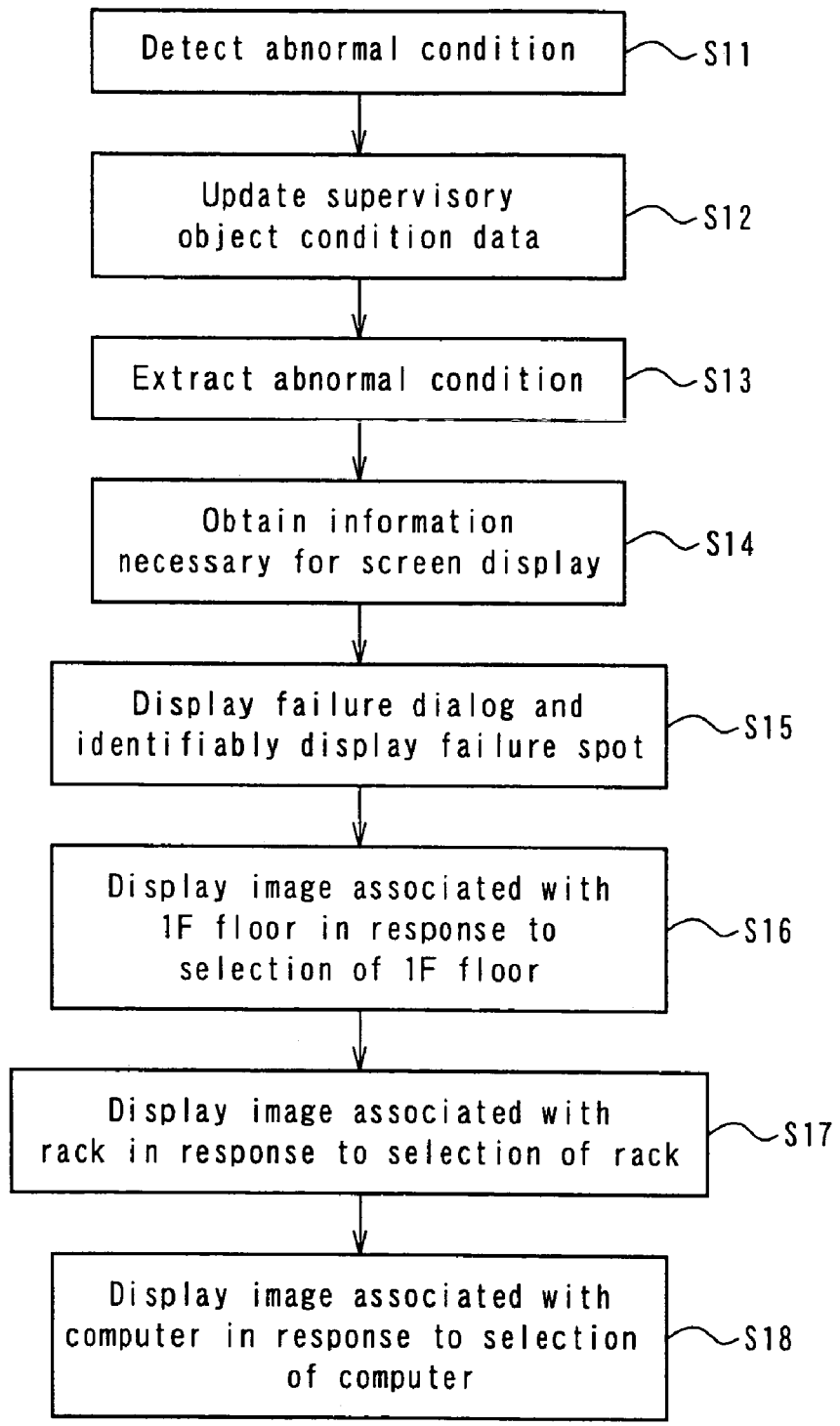
FIG. 3 is a flowchart for explaining the operation of the abnormality supervising apparatus according to the embodiment of the present invention.
Figure 4:
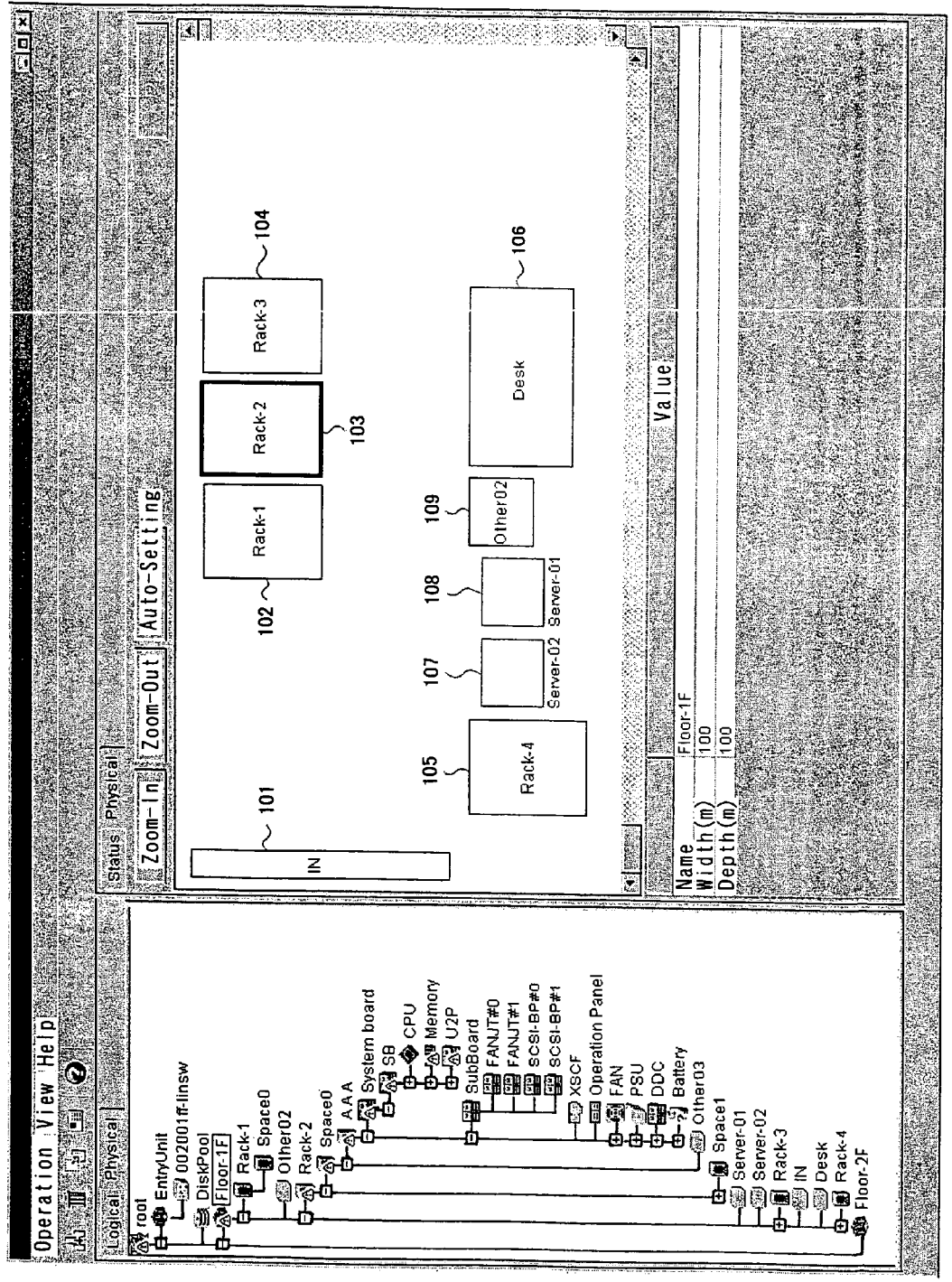
FIG. 4 is a diagram for explaining belonging data in the embodiment of the present invention.
Figure 5:
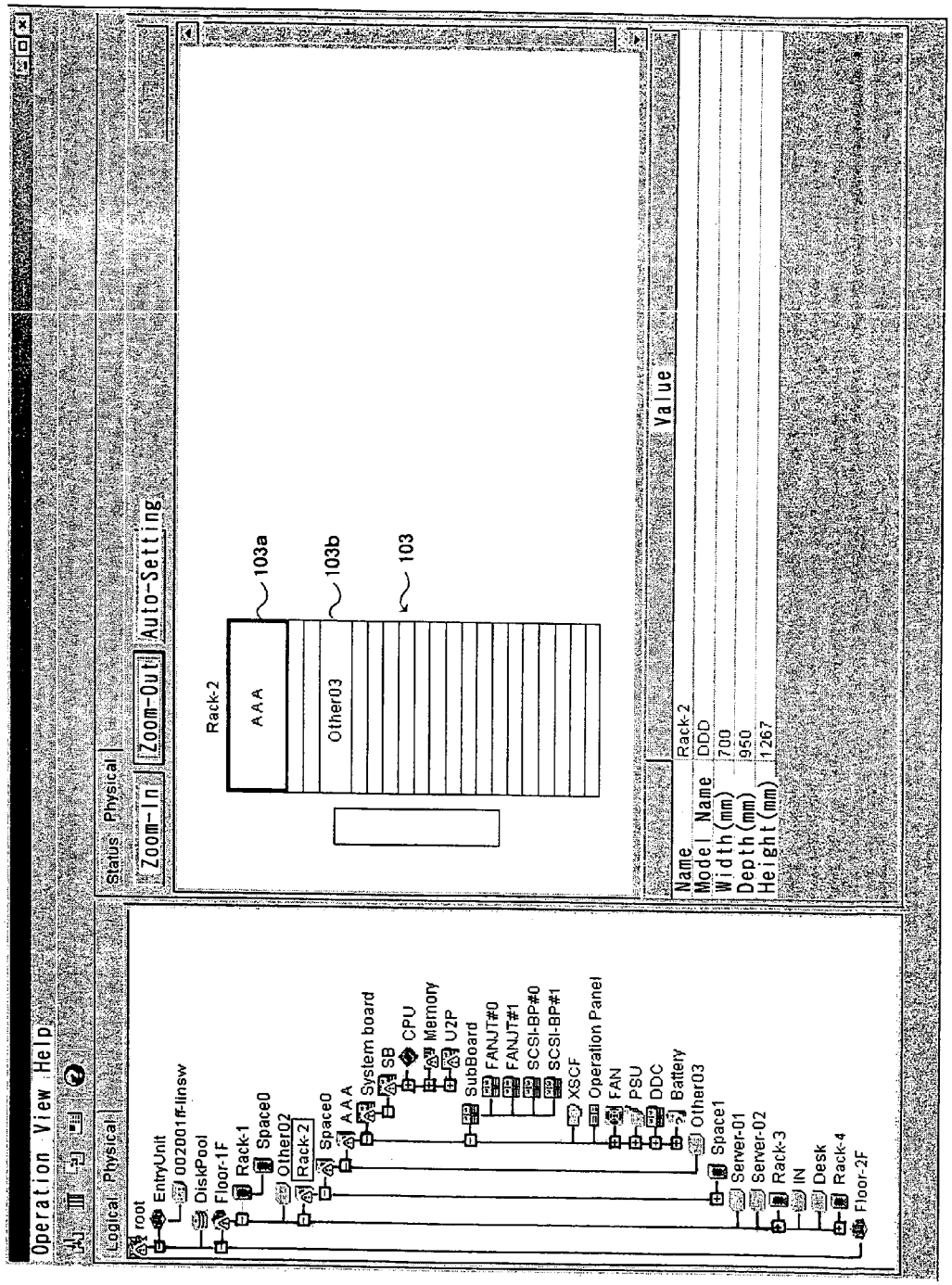
FIG. 5 is a diagram for explaining belonging data in the embodiment of the present invention.
Figure 6:
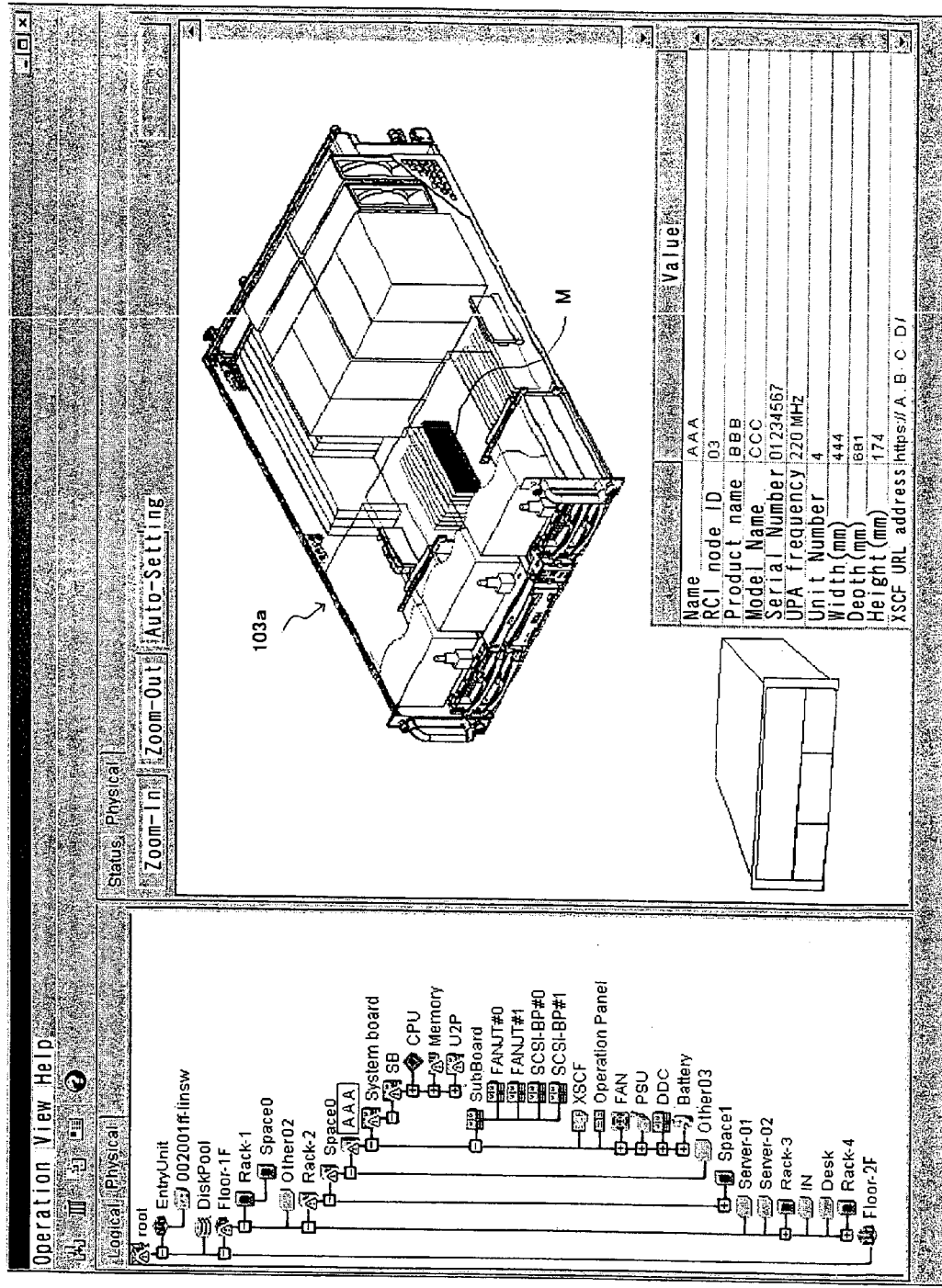
FIG. 6 is a diagram for explaining belonging data in the embodiment of the present invention.

FIG. 2 is a conceptual view for explaining this embodiment. FIG. 3 is a flowchart for explaining the operation of the abnormality supervising apparatus according to this embodiment. FIGS. 4 to 6 are diagrams for explaining belonging data in this embodiment.

The abnormal condition detection section 908 monitors events logged into a system log concerning the operating condition of each supervisory object to detect an abnormality in the operating condition of the supervisory object (abnormal condition detecting step; S11).

Abnormal conditions to be detected by the abnormal condition detection section 908 are, for example, an abnormality in temperature in a device, and an abnormality in the number of revolutions of a cooling fan. It is possible to set other abnormal conditions as desired according to need.

It should be noted that the system log may be stored in a storage area in the abnormality supervising apparatus E. It is also possible to store the system log in a storage area in a server or the like that is disposed outside the abnormality supervising apparatus (e.g. in a log file for recording abnormal conditions). The system log is recorded by a driver, a system management program or the like when an abnormality occurs in a supervisory object.

Next, an abnormal condition detected by the abnormal condition detection section 908 is reported to the database 8 to update information concerning the relevant supervisory object in the supervisory object condition data 803 (S12).

Subsequently, the supervisory object condition extraction section 903 in the data extraction interface F extracts supervisory object condition data 803 from the database 8 (S13).

From the supervisory object condition data 803 extracted in this way, information necessary for screen display is obtained (S14), e.g. the updated information on the operating condition of the supervisory object, and the abnormality in the operating condition thereof.

When an abnormality in the operating condition of a supervisory object is detected at the above-described step, a failure dialog is displayed on the display section 906 to inform the system administrator of the occurrence of an abnormality in one of supervisory objects supervised by the abnormality supervising apparatus. Further, a condition in which belonging data is to be displayed on the screen is decided on the basis of the obtained supervisory object condition information and information concerning the relevant supervisory object extracted from the belonging data 802 by the belonging data extraction section 902.

The display screen decision section 905 instructs the display section 906 to display a necessary screen on the basis of the decided condition for screen-displaying the belonging data, and supervisory object data (image information on the supervisory object, specifications, etc.) 801 that is information concerning the supervsory object extracted by the supervisory object data extraction section 901.

FIGS. 4 to 6 show examples of screen display decided by the display screen decision section 905 as stated above. In FIG. 4, the right-hand part displays belonging data associated with a floor 1F. The left-hand part of FIG. 4 displays belonging data by using a tree structure to allow the user to easily grasp where the floor 1F is located in the belonging data set hierarchically. In this example, on the floor 1F (Floor-1F) are disposed IN (101), Rack-1 (102), Rack-2 (103), Rack-3 (104), Rack-4 (105), Server-02 (107), Server-01 (108), Other02 (109) and Desk (106).

Belonging data at an arbitrary hierarchical level comprises image data for displaying a plurality of belonging data at a hierarchical level that is one level lower than the arbitrary hierarchical level (hence, Rack-1, Rack-2, Rack-3, Rack-4, Server-02, Server-01, Other02, etc. are also belonging data). The belonging data display section S displays hierarchically and linkably belonging data to which a supervisory object detected having an abnormal condition belongs. Thus, with respect to belonging data at an arbitrary hierarchical level, a plurality of belonging data at a hierarchical level that is one level lower than the arbitrary hierarchical level are displayed, and among the displayed belonging data, belonging data to which a supervisory object detected having an abnormal condition belongs is displayed identifiably (identifiably displaying step; S15).

It is herein assumed that the supervisory object detected having an abnormal condition is a memory M incorporated in a rack-mountable unit 103a disposed in Rack-2 (103) on Floor-1F.

In the tree structure shown in the left-hand part of FIG. 4 also, a failure mark is put on belonging data (Floor-1F, Rack-2 and rack-mountable unit 103a in this example) that are present on the path from the supervisory object (memory M in this example) detected having an abnormal condition to the route (the highest hierarchical level of the tree) of the tree structure (propagation of the failure condition). Instead of putting a failure mark, the display method or the display color may be changed. In this embodiment, the failure mark putting processing may be carried out on the database 8 side. Alternatively, the belonging data display section S may be arranged to perform the failure mark putting processing.

The system administrator recognizes the occurrence of an abnormality in one of the supervisory objects from the failure dialog displayed on the display section 906 and the failure marks on the tree, and actuates the operating input section (mouse, keyboard, etc.) 907 to select Floor-1F (1) highlighted in the image of a building [assumed to be a two-story building consisting of Floor-1F (1) and Floor-2F (2)] displayed on the display section 906 (see FIG. 2). Consequently, the display section 906 displays belonging data (floor layout) associated with Floor-1F (S16).

The same result can be obtained by selecting a node given a failure mark (Floor-1F in this example) on the tree as shown in FIG. 4. In this case, a tree structure at a level one level lower than Floor-1F, which has been closed in the initial state, is developed (see FIG. 4).

The system administrator selects Rack-2 (103) highlighted by the thick lines from the belonging data (floor layout) associated with Floor-1F, which is displayed on the display section 906 (see FIG. 2). In this case, there is also a failure mark put on a node corresponding to Rack-2 in the tree display on the left-hand part of the screen. As a result of selecting Rack-2 in this way, belonging data associated with Rack-2 (i.e. an image showing the arrangement of Rack-2) is displayed in the area on the display section 906 where the floor layout was being displayed (S17; see FIG. 5).

Rack-2 (103) in this example has a rack-mountable unit 103a and Others03 (103b). The rack-mountable unit 103a is highlighted by the thick lines (see FIG. 5).

The system administrator actuates the operation input section 907 to select the highlighted rack-mountable unit (computer) 103a from the belonging data associated with Rack-2, which is displayed on the display section 906. Consequently, belonging data associated with the rack-mountable unit 103a (i.e. an image showing the arrangement of the rack-mountable unit 103a) is displayed on the area of the display section 906 where the belonging data associated with Rack-2 was being displayed (S18; FIG. 6).

Thus, belonging data associated with the rack-mountable unit 103a (i.e. an image showing the layout and arrangement of components in the rack-mountable unit 103a) is displayed on the display section 906. In the displayed belonging data, the memory M having an abnormal condition is highlighted so that it is possible to locate the position of the memory M in the rack-mountable unit 103a. Further, as shown in FIG. 6, information concerning the specifications of the rack-mountable unit 103a, etc. is displayed, together with the image showing the layout and arrangement of the components in the rack-mountable unit 103a, thereby providing information for identification of the abnormal condition and recovery therefrom.

As has been stated above, objects that have heretofore been handled as being separate from each other, such as a building, floors, racks for mounting computers and disk units, rack-mountable units (computers), and disk units for storing data, are all handled as a single physical hierarchical model (i.e. spatial positions where supervisory objects are present, or articles including supervisory objects, or articles having supervisory objects as constituent elements are unifiedly managed as belonging data), thereby enabling the system administrator to search for an abnormality spot by following images displayed on the screen in such a manner as to be easy to perceive intuitively. In other words, it is possible to identify an abnormality spot (e.g. a broken-down component) while visually imaging the position of an actual device or component with the feeling of unifiedly managing the system.

It is the event that abnormality occurs simultaneosly in a plurality of supervisory objects, the abnormal conditions of the supervisory objects are compared with each other in term of the severity level of abnormal condition, and the abnormal condition of the highest severity level is propagated to higher hierarchical levels of the tree.

Further, as operating conditions, normal (○), warning (Δ), and abnormal (X) are defined. These conditions are in size relation to each other in terms of the severity level as follows: normal (○)<warning (Δ)<abnormal (X). Accordingly, in the event that one supervisory object is in a warning (Δ) condition and, at the same time, another supervisory object is in an abnormal (X) condition, the abnormal (X) condition, which is higher in the severity level than the warning (Δ) condition, is propagated to higher hierarchical levels of the tree. Thus, the system administrator can grasp the fact that one of the supervisory objects is in the abnormal (X) condition.

Thus, belonging data to which a supervisory object detected having an abnormal condition belongs indicates the severity level of the abnormal condition of the supervisory object. In the event that abnormal conditions are detected in a plurality of supervisory objects belonging to belonging data at an arbitrary hierarchical level, the belonging data display section displays belonging data related to one of the plurality of supervisory objects that is the highest in terms of the severity level of abnormal conditions among them with respect to the belonging data at the arbitrary hierarchical level.

In addition, the present invention provides an abnormality search support method for use in an abnormality supervising apparatus wherein belonging data to which a particular supervisory object belongs is displayed 5 hierarchically and linkably on the basis of hierarchical data comprising a plurality of hierarchically set belonging data to which a plurality of supervisory objects belong, respectively. The abnormality search support method includes an abnormal condition detecting step of detecting an abnormal condition in each of the supervisory objects, and an identifiably displaying step of displaying, with respect to belonging data at a designated hierarchical level, a plurality of belonging data at a hierarchical level that is one level lower than the designated hierarchical level, wherein belonging data to which a supervisory object detected having an abnormal condition belongs is displayed identifiably.

In the above-described abnormality search support method, when the belonging data identifiably displayed at the identifiably displaying step is selected, a plurality of belonging data at a hierarchical level that is one level lower than the selected belonging data are displayed, and at this time, belonging data to which the supervisory object detected having an abnormal condition belongs is displayed identifiably.

It should be noted that the abnormality search support method according to this embodiment is implemented by instructing a computer to execute an abnormality search support program that is written into a computer-readable storage medium from a storage area (not shown) in the abnormality supervising apparatus. In the present invention, examples of the above-described computer-readable storage medium include portable storage mediums, e.g. CD-ROMs, flexible disks, DVD disks, optical magnetic disks, and IC cards, databases retaining computer programs, other computers, databases thereof, and transmission mediums on communication lines.

More specifically, the abnormality search support program according to this embodiment instructs a computer to execute an abnormality search support method in an abnormality supervising apparatus wherein belonging data to which a particular supervisory object belongs is displayed hierarchically and linkably on the basis of hierarchical data comprising a plurality of hierarchically set belonging data to which a plurality of supervisory objects belongs, respectively. The abnormality search support program instructs the computer to execute processing including an abnormal condition detecting step of detecting an abnormal condition in each of the supervisory objects, and an identifiably displaying step of displaying, with respect to belonging data at a designated hierarchical level, a plurality of belonging data at a hierarchical level that is one level lower than the designated hierarchical level, wherein belonging data to which a supervisory object detected having an abnormal condition belongs is displayed identifiably.

In the above-described abnormality search support program, when the belonging data identifiably displayed at the identifiably displaying step is selected, a plurality of belonging data at a hierarchical level that is one level lower than the selected belonging data are displayed, and at this time, belonging data to which the supervisory object detected having an abnormal condition belongs is displayed identifiably.

As has been stated above, according to the present invention, a physical image of a floor or a rack where a multiplicity of information processing related devices are installed is intuitively expressed, together with the condition of each device, in a form as close to the actual one to allow visual perception of the physical layout and condition of each individual information processing related device in a large-scale configuration, thereby making it possible to grasp the operating condition of the system. In particular, physical relationships between a plurality of supervisory objects and screens to be displayed are arranged in the form of a hierarchical model, and the idea of propagating a condition on the model is introduced, thereby making it possible to identify a spot at which abnormality has occurred at an early stage.

When a supervisory object where abnormality has occurred is to be identified, it is possible to visually identify the failure condition and the location of the broken-down device by referring to the floor layout or the rack layout. In this regard, because data and related display screens are under unified management, a spot at which abnormality has occurred can be identified at an early stage by a simple operation.

It should be noted that the present invention is not necessarily limited to the foregoing embodiments but can be modified in a variety of ways without departing from the gist of the present invention.

What is claimed is:

1. An abnormality supervising apparatus comprising:
a belonging data setting section that sets hierarchically a plurality of belonging data to which a plurality of supervisory objects belong, respectively;
an abnormal condition detection section that detects an abnormal condition in each of the supervisory objects; and
a belonging data display section that displays, when an abnormal condition is detected in a supervisory object by said abnormal condition detection section, belonging data to which said supervisory object detected having an abnormal condition belongs, hierarchically and linkably.

2. A abnormality supervising apparatus according to claim 1, wherein belonging data at an arbitrary hierarchical level comprises image data for displaying a plurality of belonging data at a hierarchical level that is one level lower than said arbitrary hierarchical level, and among the plurality of belonging data at the next lower hierarchical level that are displayed with respect to the belonging data at said arbitrary hierarchical level, belonging data to which said supervisory object detected having an abnormal condition belongs is displayed identifiably.

3. An abnormality supervising apparatus according to claim 1, wherein said plurality of belonging data represent spatial positions where said supervisory objects are present, or articles including said supervisory objects, or articles having said supervisory objects as constituent elements.

4. An abnormality supervising apparatus according to claim 1, wherein the belonging data to which said supervisory object detected having an abnormal condition belongs indicates a severity level of the abnormal condition of said supervisory object.

5. An abnormality supervising apparatus according to claim 4, wherein when abnormal conditions are detected in a plurality of supervisory objects belonging to belonging data at an arbitrary hierarchical level, said belonging data display section displays belonging data related to one of the plurality of supervisory objects that is highest in terms of severity level of abnormal condition among them with respect to the belonging data at said arbitrary hierarchical level.

6. An abnormality search support method for use in an abnormally supervising apparatus wherein belonging data to which a particular supervisory object belongs is displayed hierarchically and linkably on a basis of a hierarchical data comprising a plurality of hierarchically set belonging data to which a plurality of supervisory objects belong, respectively, said method comprising:
   an abnormal condition detecting step of detecting an abnormal condition in each of the supervisory objects; and
   an identifiably displaying step of displaying, with respect to belonging data at a designated hierarchical level, a plurality of belonging data at a hierarchical level that is one level lower than the designated hierarchical level, wherein belonging data to which a supervisory object detected having an abnormal condition belongs is displayed identifiably.

7. An abnormality search support method according to claim 6, wherein when the belonging data identifiably displayed at said identifiably displaying step is selected, a plurality of belonging data at a hierarchical level that is one level lower than the selected belonging data are displayed, and at this time, belonging data to which the supervisory object detected having an abnormal condition belongs is displayed identifiably.

8. An abnormality search support program for instructing a computer to execute an abnormality search support method in an abnormality supervising apparatus wherein belonging data to which a particular supervisory object belongs is displayed hierarchically and linkably on a basis of hierarchical data comprising a plurality of hierarchically set belonging data to which a plurality of supervisory objects belong, respectively, said program instructing the computer to execute processing comprising:
   an abnormal condition detecting step of detecting an abnormal condition in each of the supervisory objects; and
   an identifiably displaying step of displaying, with respect to belonging data at a designated hierarchical level, a plurality of belonging data at a hierarchical level that is one level lower than the designated hierarchical level, wherein belonging data to which a supervisory object detected having an abnormal condition belongs is displayed identifiably.

9. An abnormality search support program according to claim 8, wherein when the belonging data identifiably displayed at said identifiably displaying step is selected, a plurality of belonging data at a hierarchical level that is one level lower than the selected belonging data are displayed, and at this time, belonging data to which the supervisory object detected having an abnormal condition belongs is displayed identifiably.

* * * * *

UNITED STATES PATENT AND TRADEMARK OFFICE
CERTIFICATE OF CORRECTION

PATENT NO.         : 7,034,686 B2  
APPLICATION NO. : 10/848128  
DATED                  : April 25, 2006  
INVENTOR(S)         : Yasuhiro Matsumura It is certified that error appears in the above-identified patent and that said Letters Patent is hereby corrected as shown below:

Column 8, Line 42, change "A" to --An--.

Column 9, Line 5, change "abnormally" to --abnormality--.

Signed and Sealed this

Twenty-eighth Day of November, 2006

JON W. DUDAS  
*Director of the United States Patent and Trademark Office*